(12) United States Patent
Hesse et al.

(10) Patent No.: US 6,522,961 B2
(45) Date of Patent: Feb. 18, 2003

(54) METHOD AND DEVICE FOR DETERMINING THE DRIVING CONDITION OF A VEHICLE

(75) Inventors: Karl-Heinz Hesse, Sarstedt (DE); Olaf Thielking, Hannover (DE)

(73) Assignee: WABCO GmbH & Co. OHG, Hannover (DE)

( * ) Notice: Subject to any disclaimer, the term of this patent is extended or adjusted under 35 U.S.C. 154(b) by 0 days.

(21) Appl. No.: 10/096,632

(22) Filed: Mar. 13, 2002

(65) Prior Publication Data

US 2002/0165651 A1 Nov. 7, 2002

(30) Foreign Application Priority Data

Mar. 14, 2001 (DE) .......................................... 101 12 159

(51) Int. Cl.$^7$ ................................................. G01P 7/00
(52) U.S. Cl. ...................................... 701/37; 280/5.515
(58) Field of Search ............................. 701/36, 37, 38, 701/39; 73/11.04; 180/337; 280/5.5, 5.501–5.515; 267/2

(56) References Cited

U.S. PATENT DOCUMENTS 6,311,110 B1 * 10/2001 Ivers et al. ............... 280/5.501
6,360,148 B1 * 3/2002 Halpin ........................ 701/37

FOREIGN PATENT DOCUMENTS

| DE | 34 37 799 C2 | 11/1987 |
| DE | 40 15 960 A1 | 1/1991 |
| DE | 41 07 090 A1 | 10/1991 |
| DE | 41 10 105 A1 | 10/1991 |
| DE | 41 33 237 A1 | 4/1993 |
| DE | 41 40 270 A1 | 6/1993 |
| DE | 42 40 614 A1 | 6/1994 |
| DE | 196 48 176 A1 | 5/1998 |
| EP | 0 468 941 A2 | 1/1992 |

* cited by examiner

Primary Examiner—Richard M. Camby
(74) Attorney, Agent, or Firm—Kramer Levin Naftalis & Frankel LLP

(57) ABSTRACT

The present invention relates to a method and device for determining the driving condition of a vehicle, especially in the event of failure or absence of a speed sensor. For this purpose, the spring travels between a vehicle body and vehicle axles are continuously sampled. From the measured spring-travel values, the mean values or the sums are formed for each vehicle axle. From these mean values or sums, the number of local extrema within a predefinable observation period is determined. Thereafter, the frequency of the local extrema and thus the frequency of the vertical relative motion between vehicle body and vehicle axle are determined. The determined frequency of the local extrema is compared with a predefinable frequency threshold value, which defines a stationary condition of the vehicle, a moving condition of the vehicle being indicated if this threshold value is exceeded. The comparison result is delivered for corrective actions in regulating or control devices and/or monitoring devices of the vehicle.

24 Claims, 2 Drawing Sheets

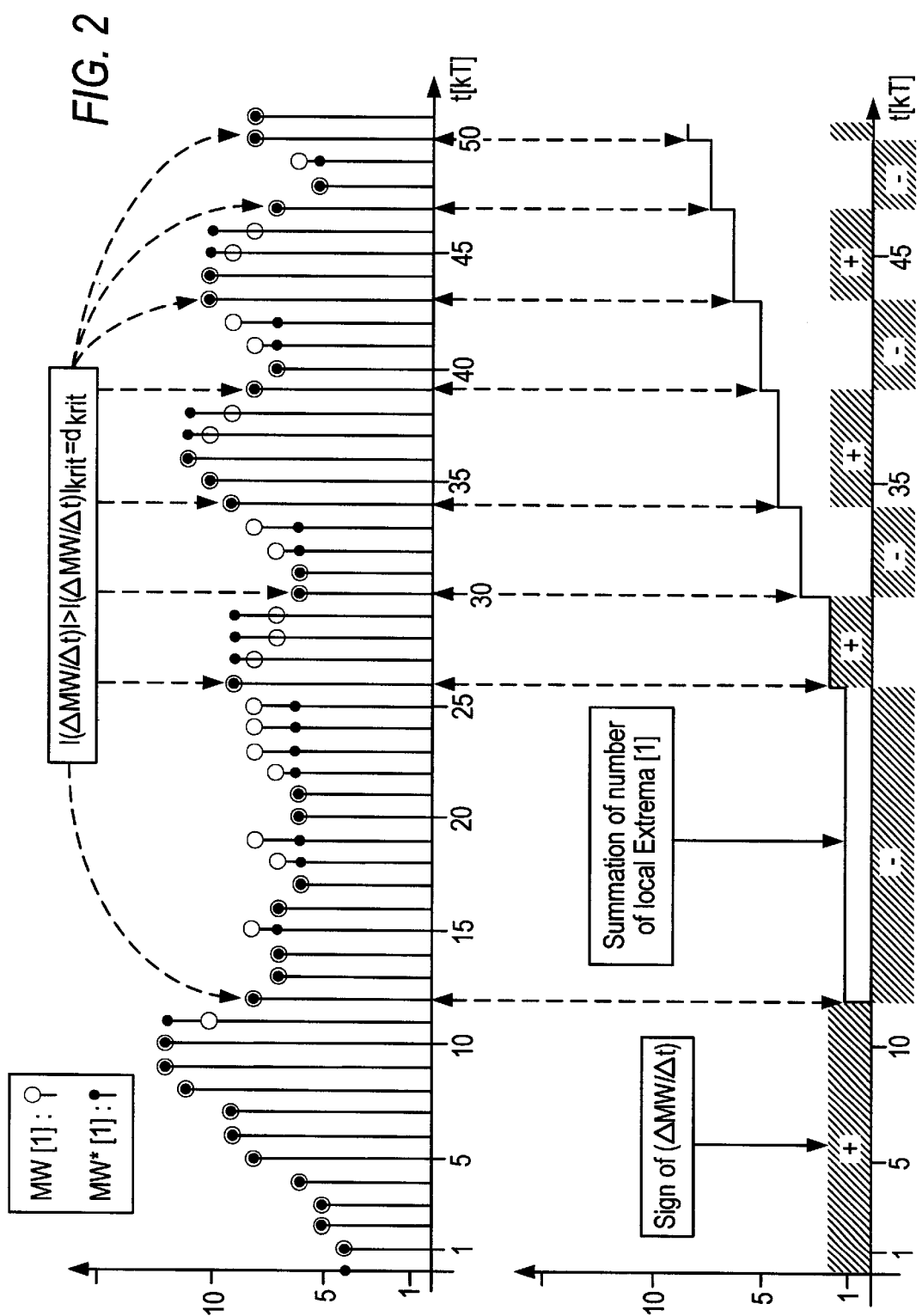

METHOD AND DEVICE FOR DETERMINING THE DRIVING CONDITION OF A VEHICLE

BACKGROUND OF THE INVENTION

The present invention relates to a method for determining the driving condition of a vehicle in the event of a failure or absence of a speed sensor, as well as to a device for performing the method.

In the event of a failure or absence of a speed sensor, it would be impossible to distinguish between the moving and stationary condition of a vehicle, which could, for example, detrimentally affect the ability of level and shock-absorber regulators to function.

German Patent Application 19648176 teaches a level-regulating device for regulating the distance between the chassis and the body of an air-cushioned vehicle by controlling the vibration dampers. For such control, an actuating signal is used, which corresponds to a demand for damping the motion of the vehicle body as determined by a known technique.

In order to improve driving safety and comfort, this damping demand is modified by a rough-terrain parameter that describes the road condition. The rough-terrain parameter is computed using the spring-travel acceleration, which is generated by double differentiation of the measured spring travel. The body motions to be damped are defined by determining the rolling angle and rolling frequency, as well as of the pitch angle and the pitch frequency of the vehicle body. This known regulating device is usable to only a limited extent for distinguishing between the moving and stationary condition of a vehicle as well as for determining the frequency of the time variation of the spring travels which may be used for (i) monitoring the plausibility of a driving-speed sensor, and (ii) disabling or enabling any desired functions of an electronically controlled level regulator or an electronic shock-absorber controller or regulator as a function of determined driving condition (stationary or moving) or as a function of determined frequency of the time variation of the spring travels, especially when the spring travels experience a static excursion, as can occur, for example, on uneven terrain or in the case of asymmetric loading, or when the vibrational amplitudes of the spring travels are small, as can occur, for example, during slow driving on smooth roads. Accordingly, it is desired to provide an improved method and apparatus for determining the driving condition of a vehicle in the event of a failure or absence of a speed sensor.

SUMMARY OF THE INVENTION

Generally speaking, in accordance with the present invention, an improved method and device is provided for determining the driving condition of a vehicle without using a speed sensor which overcomes disadvantages associated with prior art methods.

To that end, in a vehicle having at least one spring means located between a vehicle body and axle and a travel sensor for sampling spring travels, a method is provided of determining whether the vehicle is moving or stationary including the steps of measuring spring travel values, determining based on the measured spring travel values one of a mean value and a sum value, determining the number of local extrema of the one of a mean value and a sum value within a predefinable observation period, determining the frequency of the local extrema, and comparing the frequency of the local extrema with a predefinable frequency threshold value, such that the vehicle is determined to be moving when the frequency threshold value is exceeded.

Similarly, a device is provided for implementing a method as described. The method and device of the present invention make possible monitoring of the plausibility of driving-speed sensors. Even in the event of a failure or absence of a driving-speed sensor, a distinction between moving and stationary condition can be achieved by the invention. The present invention also makes it possible to determine the vibrational frequency of the spring travel or of the spring travels. As a result, functionalities of level regulators or shock-absorber regulators that must be disabled or enabled during moving or stationary condition or at certain vibrational frequencies of the spring travel or of the spring travels can be disabled or enabled by means of the invention. The inventive method and the inventive device function independently of the static excursion of the spring travel or of the spring travels.

Accordingly, an object of the present invention is to provide a method and a device with which a distinction between moving and stationary conditions of a vehicle can be made, even in the event of the failure or the absence of a driving-speed sensor.

It is a further object of the present invention to provide a method and a device with which a distinction between moving and stationary conditions of a vehicle can be made, even in the event of the failure or the absence of a driving-speed sensor, in order to be able to impose a regulating correction in a level regulator or shock-absorber controller or regulator, for example, and in order to be able to check the plausibility of a driving speed sensor that is present.

Still other objects and advantages of the present invention will in part be obvious and will in part be apparent from the specification.

The present invention accordingly comprises the several steps and the relation of one or more of such steps with respect to each of the others, and embodies features of construction, combination of elements, and arrangement of parts which are adapted to effect such steps, all as exemplified in the detailed disclosure hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 2 shows a diagram which explains the determination of local extrema of the relative motion between a vehicle body and a vehicle axle with two spring-travel sensors.

DETAILED DESCRIPTION OF THE PREFERRED EMBODIMENTS

Figure 1:
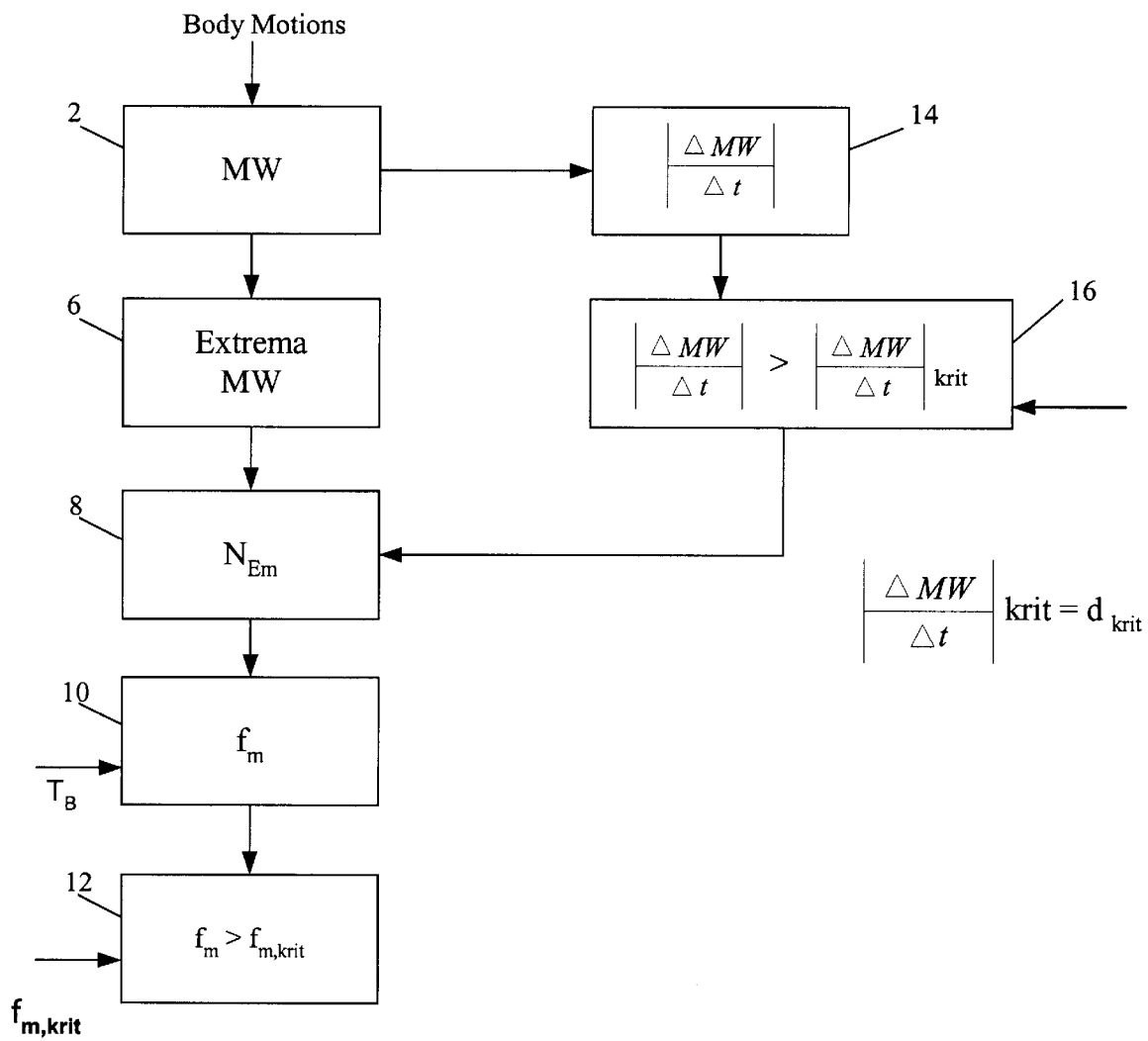
FIG. 1 shows a block diagram of a device or a system determining the driving condition of a vehicle according to a preferred embodiment of the present invention.

The method and device of the present invention are applicable in vehicles with at least one spring-travel sensor on at least one wheel or at least one axle. The invention is also applicable in vehicles which are equipped not only with at least one spring-travel sensor but also with an electronically controlled level regulator or an electronic shock-absorber controller or regulator and/or which are additionally provided with an electronic driving-speed sensor. The invention makes it possible to endow vehicles with additional functionalities which would otherwise be conceivable only in vehicles with driving-speed sensors.

Reference is now made to the drawings and, in particular, FIG. 1, which shows a device or system for determining whether a vehicle is moving or stationary according to a preferred embodiment of the present invention. The system includes a device 2 for calculating one of a mean value and a sum value, a device 6 for calculating the local extrema, a counting device or counter 8 for counting the number of local extrema of the one of a mean value and a sum value of the sampled spring-travel values within the observation period, a device 10 for computing the frequency of the local extrema, and a comparison device or comparator 12 for comparing the frequency of the local extrema with a predefinable frequency threshold value. Devices 14 and 16 are provided to allow for quantization noise when counting the local extrema.

The devices described herein may be implemented, at least in part, using software controlled programmable processing devices. One or more computer programs for configuring such programmable devices or system of devices to implement the foregoing described methods are to be considered an aspect of the present invention. Preferably, the computer programs are stored on carrier media in machine or device readable form, for example in solid-state memory.

In a preferred embodiment of the present invention, in order to determine whether a vehicle is moving, the time variation of the spring travels of the vehicle are first sampled with at least double the natural frequency of the wheel by means of spring-travel sensors. To eliminate rolling motions of the vehicle body, in a first embodiment a mean value $\bar{z}_m(t)$ is derived, by device 2, for each vehicle axle m at each sampling instant t, where $$t = kT$$

and k: sequential sample number,

T: sampling period.

This mean value $\bar{z}_m(t)$ of all $N_m$ current and possibly pre-filtered spring-travel values $z_{m_n}(t)$ recorded on this axle and supplied to device 2 as input variables is calculated as follows:

$$\bar{z}_m(t) = \frac{1}{N_m} \sum_{n=1}^{N_m} z_{m_n}(t)$$

where m: index of the axle and $N_m$: number of spring-travel sensors on axle m, is used as a measure of the relative motion between vehicle body and axle m in question.

Alternatively, instead of the mean value, there can be derived by device 2, as shown in FIG. 1, a sum MW value of the recorded current spring-travel values $z_{m_n}(t)$, where $$MW = \bar{z}'_m(t) = N_m \bar{z}_m(t) = \sum_{n=1}^{N_m} z_{m_n}(t)$$

Provided the spring-travel values $z_{m_n}(t)$ exist in whole-number format, this procedure permits operations in whole-number arithmetic and avoids floating-point operations.

Within a definable observation period $T_B$, the local extrema of the time variation of the mean value $\bar{z}_m(t)$ or of the sum $MW = \bar{z}'_m(t)$ are derived in a block 6 from the summation values MW supplied as input values and are supplied to a counting device 8 for determination of the number $N_{E_m}$ of local extrema. After expiration of observation period $T_B$, the frequency $f_m$, where $$f_m = N_{E_m}/T_B$$

of the vertical relative motion between vehicle body and axle m in question is determined in a block 10 from the ratio of the number $N_{E_m}$ of local extrema observed and the duration of observation period $T_B$. This frequency $f_m$ is then compared in a comparison device 12 with a predefinable critical value $f_{m,krit}$ allocated to the stationary condition of the vehicle, or the number $N_{E_m}$ of extrema recorded during observation period $T_B$ is compared with a predefinable critical value $N_{E_m}$ allocated to the stationary condition of the vehicle.

If the frequency $f_m$ determined in this way is above the critical value $f_{m,krit}$ or if the number $N_{E_m}$ is above the critical value $N_{E_m\,krit}$, it can be assumed by plausible inference that the vehicle is moving, since frequencies above the critical value $f_{m,krit}$ or the number of extrema above the critical value $N_{E_m\,krit}$ cannot be excited in stationary condition, and especially not by loading and unloading processes. Otherwise it can be assumed that the vehicle is stationary.

The determination of the frequency $f_m$ of vertical relative motion or the determination of the number $N_{E_m}$ of observed extrema of the vertical relative motion of vehicle body and axle is performed continuously with the observation period $T_B$, as described hereinabove.

For recognition of local extrema, however, an allowance must be made for quantization noise in the mean value $\bar{z}_m(t)$ of the spring-travel values or in the sum $MW = \bar{z}'_m(t)$ of the spring-travel values of the vertical relative motion of vehicle body and axle m. The local extrema generated in the mean value $\bar{z}_m(t)$ or in the sum $MW = \bar{z}'_m(t)$ by this noise therefore cannot be permitted to influence the computation of the frequency $f_m$. As further shown in FIG. 1, for this purpose there is provided a device 14 for determination of the amounts of the change of the mean values or of the sums MW of the recorded spring travels of the vertical relative motion, these amounts being compared in a comparison device 16 with a definable critical value $d_{krit}$, which controls counting device 8 in such a way that a local extremum is counted only when the amount of the change of the mean values or of the sums MW of the recorded spring travels of the vertical relative motion exceeds the critical value $d_{krit}$, or in other words when the following condition is satisfied by the sum MW $$\left|\frac{\Delta MW}{\Delta t}\right| = \left|\frac{\Delta \bar{z}'_m(t)}{\Delta t}\right| > \left|\frac{\Delta MW}{\Delta t}\right|_{krit} = \left|\frac{\Delta \bar{z}'_m(t)}{\Delta t}\right|_{krit} = d_{krit}$$

where $$d_{krit} \geq N_m$$

and $$\Delta \bar{z}'_m(t) = \bar{z}'_m(kT) - \bar{z}'_m((k-1)T)$$

and $\Delta t = T$.

By adjustment of the values $f_{m,krit}$ and $N_{E_m\,krit}$ as well as $T_B$ and $d_{krit}$, the method described hereinabove can be adapted to the vibrational characteristics of a vehicle and to the resolution of the spring-travel sensors.

FIG. 2 shows the application of the method described hereinabove to the determination of local extrema of the relative motion between vehicle body and the axle using the example of a vehicle axle with two spring-travel sensors and an assumed value of $d_{krit}=2$. In this FIG. 2, the variable MW corresponds to the whole-number sum $\bar{z}'_{m_n}(t)$ of the recorded spring-travel values $z_{m_n}(t)$. MW' denotes a carried mean value. This carried mean value MW' is decreased to the value MW after prior recognition of a local minimum if MW at the instant t=kT is smaller by at least $d_{krit}+1$ than at the preceding instant (k−1)T, or is increased to MW if MW at the instant t=kT is greater by at least 1 than at the preceding instant (k−1)T. The carried mean value MW' is increased to MW after prior recognition of a local maximum if MW at the instant t=kT is larger by at least $d_{krit}+1$ than at the preceding instant (k−1)T, or is decreased to MW if MW at the instant t=kT is smaller by at least 1 than at the preceding instant (k−1)T. Otherwise the carried mean value MW' remains unchanged.

When the amount of the change of the carried mean value MW' exceeds the threshold $d_{drit}$, the counting device for the number of local extrema determined within the current observation period $T_B$ is incremented.

Accordingly, the present invention relates to a method and device for determining the driving condition of a vehicle, especially in the event of failure or absence of a speed sensor. For this purpose, the spring travels between a vehicle body and vehicle axles are sampled to derive the frequency of the local extrema which is compared with a predefinable frequency threshold value. A moving condition of the vehicle is indicated if this threshold value is exceeded. The comparison result may be delivered for corrective actions in regulating or control devices and/or monitoring devices of the vehicle.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for determining whether a vehicle is moving or stationary, especially in the event of failure or absence of a speed sensor, wherein the vehicle comprises a body, at least one axle and wheels, and at least one spring means between the vehicle body and axle, comprising the steps of for the at least one spring means sampling spring travels between the body and the at least one axle of the vehicle to measure spring travel values, calculating one of a mean value and a sum value of the measured spring-travel values for the at least one vehicle axle, determining the number of local extrema of the one of a mean value and sum value of the measured spring-travel values within a predefinable observation period, determining the frequency of the local extrema and thus the frequency of the vertical relative motion between the vehicle body and the at least one vehicle axle, comparing the frequency of the local extrema with a predefinable frequency threshold value, which defines a stationary condition of the vehicle, such that the vehicle is determined to be moving when the frequency threshold value is exceeded, and using the frequency comparison result for corrective actions in at least one of a vehicle regulating or control device and a vehicle monitoring device.

2. The method according to claim 1, wherein the spring travels are sampled with a frequency that is at least double the natural frequency of the wheel of the vehicle.

3. The method according to claim 1, further comprising the steps of determining a time change of the one of a mean value and sum value, comparing the amount of the time change with a predefined critical value that allows for quantization noise and counting a local extremum whenever the critical value is exceeded.

4. The method according to claim 1, comprising the further step of monitoring the plausibility of driving-speed sensors.

5. The method according to claim 3, comprising the further step of monitoring the plausibility of driving-speed sensors.

6. The method according to claim 1, comprising the further step of disabling or enabling functionalities of a level-regulating device as a function of at least one of whether the vehicle is moving or stationary and vibrational frequencies of the spring travels.

7. The method according to claim 3, comprising the further step of disabling or enabling functionalities of a level-regulating device as a function of at least one of whether the vehicle is moving or stationary and vibrational frequencies of the spring travels.

8. The method according to claim 1, further comprising the step of disabling or enabling functionalities of a shock-absorber regulating device as a function of at least one of whether the vehicle is moving or stationary and certain vibrational frequencies of the spring travels.

9. The method according to claim 3, further comprising the step of disabling or enabling functionalities of a shock-absorber regulating device as a function of at least one of whether the vehicle is moving or stationary and certain vibrational frequencies of the spring travels.

10. A device for determining whether a vehicle is moving or stationary, the vehicle including at least one spring-travel sensor for at least one vehicle axle, the sensor sampling for at least one spring means spring travel values of the vertical relative motions between a vehicle body and the at least one vehicle axle, comprising a device for deriving one of a mean value and a sum value of the sampled spring-travel values, a device for deriving a local extrema from the one of a mean value and a sum value of the sampled spring travel values, a counting device for determining the number of local extrema of the one of a mean value and a sum value of the sampled spring-travel values within the observation period, a device for computing the frequency of the local extrema, and a device for comparing the frequency of the local extrema with a predefinable frequency threshold value that defines a stationary condition of the vehicle, the comparison device signaling that the vehicle is moving when the frequency of the local extrema exceeds the frequency threshold value.

11. The device according to claim 10, wherein the spring-travel sensor samples the spring travels with at least double the natural frequency of a wheel of the vehicle.

12. The device according to claim 10, further comprising a device for determining the amount of a time change of the one of a mean value and a sum value and a comparison device connected to the time of change device, in which the determined amount of time change is compared with a predefinable critical value that allows for quantization noise, and which increments the counting device when the amount of the time change of the one of a mean value and a sum value exceeds the critical value.

13. In a vehicle having at least one spring means located between a vehicle body and axle and a travel sensor for sampling spring travels, a method of determining whether the vehicle is moving or stationary comprising the steps of measuring spring travel values, determining based on the measured spring travel values one of a mean value and a sum value, determining the number of local extrema of the one of a mean value and a sum value within a predefinable observation period, determining the frequency of the local extrema, and comparing the frequency of the local extrema with a predefinable frequency threshold value, such that the vehicle is determined to be moving when the frequency threshold value is exceeded.

14. The method according to claim 13, wherein the spring travels are sampled with a frequency that is at least double the natural frequency of the wheel of the vehicle.

15. The method according to claim 13, further comprising the steps of determining a time change of the one of a mean value and sum value, comparing the amount of the time change with a predefined critical value that allows for quantization noise and counting a local extremum whenever the critical value is exceeded.

16. The method according to claim 13, further comprising the step of using the frequency comparison result for corrective actions in at least one of a vehicle regulating or control device and a vehicle monitoring device.

17. The method according to claim 13, further comprising the step of controlling a level-regulating device as a function of at least one of whether the vehicle is moving or stationary and vibrational frequencies of the spring travels.

18. The method according to claim 13, further comprising the step of controlling a shock-absorber regulating device as a function of at least one of whether the vehicle is moving or stationary and certain vibrational frequencies of the spring travels.

19. The method according to claim 13, comprising the further step of monitoring the plausibility of driving-speed sensors.

20. The method according to claim 13, wherein the frequency is calculated as the number of local extrema divided by the predefinable observation period.

21. In a vehicle having at least one spring means located between a vehicle body and axle and a travel sensor for sampling spring travels, a method of determining whether the vehicle is moving or stationary is provided comprising the steps of measuring spring travel values, determining based on the measured spring travel values one of a mean value and a sum value, determining the number of local extrema of the one of a mean value and a sum value within a predefinable observation period and comparing the number of local extrema with a predefinable local extrema threshold value, such that the vehicle is determined to be moving when the local extrema threshold value is exceeded.

22. In a vehicle having at least one spring means located between a vehicle body and axle and a travel sensor for sampling spring travels, a system for determining whether the vehicle is moving or stationary is provided comprising means for deriving one of a mean value and a sum value of the sampled spring-travel values, means for deriving a local extrema from the one of a mean value and a sum value of the sampled spring travel values, means for counting the number of local extrema of the one of a mean value and a sum value of the sampled spring-travel values within the observation period, device for computing the frequency of the local extrema, and means for comparing the frequency of the local extrema with a predefinable frequency threshold value that defines a stationary condition of the vehicle, the means for comparing signaling that the vehicle is moving when the frequency of the local extrema exceeds the frequency threshold value.

23. The device according to claim 22, wherein the spring-travel sensor samples the spring travels with at least double the natural frequency of a wheel of the vehicle.

24. The device according to claim 22, further comprising means for determining the amount of a time change of the one of a mean value and a sum value and comparison means connected to the time of change device, in which the determined amount of time change is compared with a predefinable critical value that allows for quantization noise, and which increments the means for counting when the amount of the time change of the one of a mean value and a sum value exceeds the critical value.

* * * * *